UNITED STATES PATENT OFFICE.

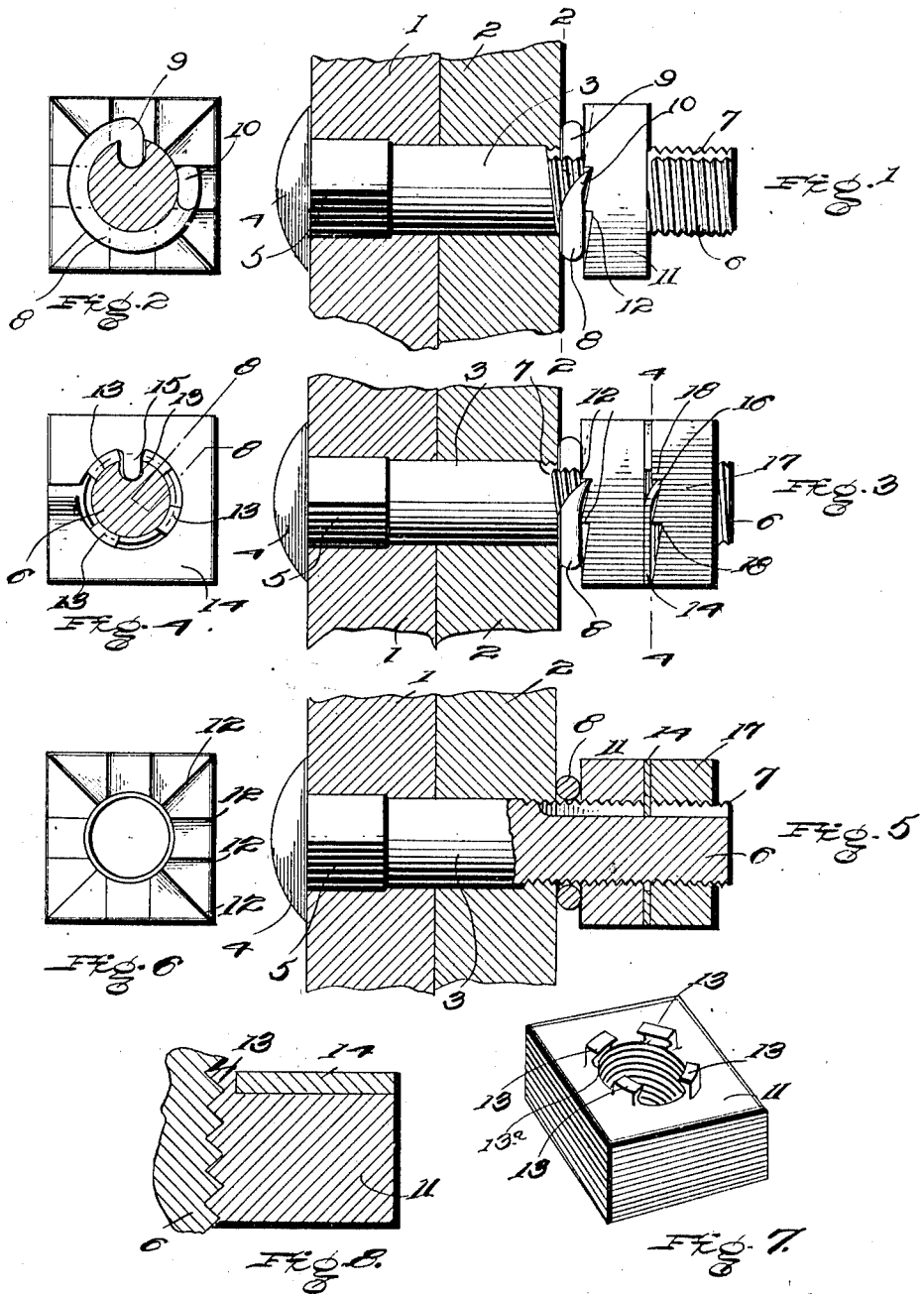

ARTHUR W. LEET, OF MADISON, OHIO.

LOCKED NUT.

1,012,376. Specification of Letters Patent. Patented Dec. 19, 1911.

Application filed February 9, 1911. Serial No. 607,472.

*To all whom it may concern:*

Be it known that I, ARTHUR W. LEET, a citizen of the United States of America, residing at Madison, in the county of Lake and State of Ohio, have invented certain new and useful Improvements in Locked Nuts, of which the following is a specification, reference being had therein to the accompanying drawing.

This invention relates to nut locks and the principal object of the same is to provide an improved means for holding a locking washer in place between two nuts.

This invention is illustrated in the accompanying drawings, wherein:—

Figure 1 is a sectional view through a pair of plates and shows the bolt having one nut locked in position. Fig. 2 is a sectional view along the line 2—2 in Fig. 1 looking toward the nut. Fig. 3 is a view similar to Fig. 1 and shows a second nut in place. Fig. 4 is a sectional view along the line 4—4 in Fig. 3, looking toward the first nut. Fig. 5 is a view similar to Fig. 3, the nuts and end portion of the bolts being shown in sections. Fig. 6 is a view of the inner face of the inner nut. Fig. 7 is a perspective view looking at the outer face of the nut shown in Fig. 6. Fig. 8 is a sectional view through the nut and bolt taken on the line 8—8 in Fig. 4.

This invention is used to securely lock a nut upon a bolt which joins two pieces of material together, such for instance, as the plates 1 and 2, through which the securing bolt 3 passes. The bolt is provided with an enlarged head 4 and a rectangular shoulder 5 which fits into a rectangular opening and prevents the bolt from turning. The other end of the bolt is provided with the usual threads 6 and with a longitudinally extending slot 7. A coil washer 8 formed of spring metal is placed upon the bolt and has one end 9 bent inwardly to rest in the slot 7. The other end 10 of the washer 8 is beveled and bent outwardly to form a sharp spur. A nut 11 is threaded upon the bolt and is provided on its inner face with a plurality of notches forming teeth 12, with which the end 10 of the washer 8 engages and prevents the nut from being unscrewed.

The outer face of the nut 11 is provided with a plurality of lugs 13 extending from the central opening. A washer 14 is placed upon the bolt and surrounds the lugs 13. The washer is provided with a tongue 15 which passes between two of the lugs 13 and enters the slot 7, thus preventing the washer from turning. The washer is split at one side and bent to form a tongue 16. A second nut 17 is threaded upon the bolt and is provided with teeth 18, upon its inner face with which the tongue 16 engages and locks the nut upon the bolt.

It should be noted that the lugs 13 are of slightly greater length than the thickness of the washer 14 and are provided with beveled inner faces 13$^a$ which form a continuance of the threads of the central opening of the nut. When the nut 17 is screwed tightly it comes in contact with the lugs 13 and bends them toward the bolt and causes their sharp edges to grip the threads of the bolt and hold the nut more tightly in place.

What I claim is:—

1. A nut lock comprising a bolt having a longitudinal slot in its threaded end, a nut threaded upon said bolt, said nut being provided upon one face with a plurality of lugs extending from its central opening, a washer placed upon said bolt and surrounding said lugs, a tongue formed upon said washer and extending between two of said lugs, and into said slot, said washer being split and bent to form a tooth, a second nut threaded upon said bolt, and teeth formed upon the inner face of said second nut and adapted to be engaged by said tongue to lock said second nut in place.

2. A nut lock comprising a bolt, a nut threaded upon said bolt, lugs formed upon the outer face of said nut, and adjacent the threaded central opening of said nut, the inner faces of said lugs being beveled and forming a continuation of the threads of said central opening, a washer placed upon said bolt and against said nut, said washer being of less thickness than said lugs, and a second nut threaded upon said bolt and adapted to be brought into contact with said lugs to bend said lugs to cause the inner edges of said lugs to grip the threads of said bolt.

In testimony whereof I hereunto affix my signature in presence of two witnesses.

ARTHUR W. LEET.

Witnesses:
BERT. E. CLARK,
GEORGIA LEET.